US012691819B2

(12) United States Patent
Keller

(10) Patent No.: US 12,691,819 B2
(45) Date of Patent: Jul. 28, 2026

(54) VEHICLE INTERIOR LIGHTING SYSTEM INCLUDING GRAPHICALLY ALTERABLE PANEL

(71) Applicant: FCA US LLC, Auburn Hills, MI (US)

(72) Inventor: Gerald J Keller, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 19/017,913

(22) Filed: Jan. 13, 2025

(65) Prior Publication Data

US 2026/0200397 A1     Jul. 16, 2026

(51) Int. Cl.
| | |
|---|---|
| *B60Q 3/60* | (2017.01) |
| *B60Q 3/217* | (2017.01) |
| *B60Q 3/70* | (2017.01) |
| *F21V 5/04* | (2006.01) |
| *F21V 7/00* | (2006.01) |
| *F21V 9/40* | (2018.01) |

(Continued)

(52) U.S. Cl.
CPC .............. *B60Q 3/60* (2017.02); *B60Q 3/217* (2017.02); *B60Q 3/70* (2017.02); *F21V 5/04* (2013.01); *F21V 7/0025* (2013.01); *F21V 9/40* (2018.02); *F21V 14/04* (2013.01); *F21W 2106/00* (2018.01); *F21Y 2115/10* (2016.08)

(58) Field of Classification Search
CPC .......... G01F 1/167; G02F 1/166; G02F 1/165; B60Q 3/60; B60Q 3/70; F21V 14/04; F21V 9/40; G02B 26/026

See application file for complete search history.

(56) References Cited

U.S. PATENT DOCUMENTS 7,116,466 B2 * 10/2006 Whitesides ............. G02F 1/167
                                                    345/107
7,791,785 B2 * 9/2010 Knafou ............. B32B 17/10036
                                                    359/275

(Continued)

FOREIGN PATENT DOCUMENTS

JP          6880269 B2     6/2021

OTHER PUBLICATIONS

Liszewski, Andrew, et al.; McLaren's Putting Kindle Screens on Its Formula 1 Cars; Oct. 24, 2022 (3 pages).

(Continued)

*Primary Examiner* — Ismael Negron
(74) *Attorney, Agent, or Firm* — Jeremy J. Klobucar

(57) ABSTRACT

A vehicle includes a light source, a trim component having a show surface, a graphically alterable panel including light reflectors that move when an actuating electrical signal is applied to the graphically alterable panel, and a control system. The control system is coupled to the graphically alterable panel and selectively provides an actuating electrical signal to cause movement of at least some of the light reflectors. Light emitted from the light source is reflected off the graphically alterable panel, and movement of the light reflectors changes the reflectivity of the light reflectors such that movement of the light reflectors changes the reflection of light off of the panel and the appearance of the show surface. The graphically alterable panel defines at least part of the show surface or the graphically alterable panel is arranged to reflect light onto the show surface of the interior trim component.

17 Claims, 7 Drawing Sheets

(51) Int. Cl.
  *F21V 14/04*  (2006.01)
  *F21W 106/00*  (2018.01)
  *F21Y 115/10*  (2016.01)

(56) References Cited

U.S. PATENT DOCUMENTS

| | | | | |
|---|---|---|---|---|
| 7,920,320 | B2 * | 4/2011 | Watson | G02F 1/167 |
| | | | | 345/107 |
| 8,674,978 | B2 * | 3/2014 | Komatsu | G02F 1/167 |
| | | | | 345/32 |
| 8,690,408 | B2 * | 4/2014 | Li | G02B 6/005 |
| | | | | 362/606 |
| 9,363,461 | B1 * | 6/2016 | Little | H04N 9/3173 |
| 9,373,285 | B2 * | 6/2016 | Hada | G09G 3/3413 |
| 9,823,469 | B2 * | 11/2017 | Crane | G02B 27/0101 |
| 10,190,743 | B2 * | 1/2019 | Hertel | G03B 21/14 |
| 10,346,119 | B2 * | 7/2019 | LeBlanc | B60R 11/0235 |
| 10,942,538 | B2 * | 3/2021 | Battlogg | B60K 35/10 |
| 11,077,645 | B2 * | 8/2021 | Inoue | G02F 1/1333 |
| 11,467,466 | B2 * | 10/2022 | Paolini, Jr. | G02F 1/167 |
| 11,807,158 | B2 * | 11/2023 | Takahashi | B60Q 1/549 |
| 11,872,604 | B2 | 1/2024 | Tatara et al. | |
| 11,915,395 | B2 * | 2/2024 | Sharma | G02B 27/0103 |
| 12,287,556 | B2 * | 4/2025 | Adams | G02F 1/167 |
| 12,344,092 | B2 * | 7/2025 | Ahn | G02F 1/166 |
| 2003/0160736 | A1 * | 8/2003 | Faso | G02B 27/01 |
| | | | | 345/8 |
| 2013/0128607 | A1 * | 5/2013 | Li | G02B 6/002 |
| | | | | 362/603 |
| 2015/0084995 | A1 * | 3/2015 | Lee | G02F 1/133555 |
| | | | | 345/77 |
| 2016/0005353 | A1 * | 1/2016 | Bennett | G09G 3/003 |
| | | | | 345/82 |
| 2018/0052321 | A1 * | 2/2018 | Kong | G09G 3/344 |
| 2018/0105101 | A1 | 4/2018 | Tatara et al. | |
| 2018/0239134 | A1 * | 8/2018 | Franz | G02B 27/0101 |
| 2023/0331085 | A1 * | 10/2023 | Clarke | B60Q 1/0041 |
| 2025/0184614 | A1 * | 6/2025 | Larry | H04N 23/71 |
| 2025/0216047 | A1 * | 7/2025 | Huber | F21S 41/141 |

OTHER PUBLICATIONS

BMW IX Flow Featuring E Ink; Will the Colour of a BMW Change at the Touch of a Button? https://www.bmw.com/en/events/ces2022/ixflow.html; Accessed Feb. 13, 2025 (6 pages).

* cited by examiner

VEHICLE INTERIOR LIGHTING SYSTEM INCLUDING GRAPHICALLY ALTERABLE PANEL

FIELD

The present disclosure relates to an interior lighting system for a vehicle that includes a graphically alterable panel.

BACKGROUND

Vehicles include numerous interior trim components that define the surfaces seen and touched by vehicle passengers. Different trim components have different appearances even in the same lighting conditions, which can change the interior appearance of the vehicle between vehicles having different types of trim components. Further, interior accent lighting and displays can be negatively impacted and washed out in bright light conditions, and many such lighting displays are only used at night. Further, coverings of the trim pieces have a set design or appearance that is not changeable.

SUMMARY

In at least some implementations, a vehicle includes a light source that emits visible light, a trim component having a show surface arranged to be visible within a passenger compartment of the vehicle, a graphically alterable panel including light reflectors that move when an actuating electrical signal is applied to the graphically alterable panel, and a control system. The control system is coupled to the graphically alterable panel and includes or controls a power supply adapted to selectively provide the actuating electrical signal to the graphically alterable panel to cause movement of at least some of the light reflectors. Light emitted from the light source is reflected off the graphically alterable panel, and movement of the light reflectors changes the reflectivity of the light reflectors such that movement of the light reflectors changes the reflection of light off of the graphically alterable panel and the appearance of the show surface. The graphically alterable panel defines at least part of the show surface of the interior trim component or the graphically alterable panel is arranged to reflect light onto the show surface of the interior trim component.

In at least some implementations, the graphically alterable panel includes electronic ink in multiple cells, and the actuating electrical signal is provided to at least some of the multiple cells independently of at least some other cells of the multiple cells. In at least some implementations, the electronic ink includes reflective particles and liquid within the multiple cells, and wherein the reflective particles within one of the multiple cells move when the actuating electrical signal is provided to the cell. In at least some implementations, movement of the reflective particles includes rotation of the reflective particles so that different portions of the reflective particles are exposed to the outer surface of the graphically alterable panel. In at least some implementations, movement of the reflective particles includes movement of the reflective particles either toward or away from the outer surface.

In at least some implementations, the light source emits visible light of more than one color. In at least some implementations, the light source includes an emitter that is controllable and can emit light at different wavelengths. In at least some implementations, the light source is controllable to vary the luminance of the emitted light. In at least some implementations, a reflector positioned in the path of emitted light from the light source and arranged to reflect light onto the panel.

In at least some implementations, multiple interior trim components are provided, each interior trim component includes a panel and the panels of at least two of the interior trim components are aligned and are controllable to provide a pattern that spans from one of the panels of the at least two interior trim components to the other one of the panels of the at least two interior trim components.

In at least some implementations, a light modifier is arranged to control at least part of the light from the light source that is directed onto the graphically alterable panel. In at least some implementations, the light modifier is a lens is arranged between the light source and the graphically alterable panel. In at least some implementations, the light modifier is arranged between the graphically alterable panel and the show surface.

In at least some implementations, the light source and the graphically alterable panel are arranged in a space behind the interior trim component and light is directed onto the show surface through an opening between the space and the show surface.

In at least some implementations, an interior light system for a vehicle includes a light source that emits visible light, a graphically alterable panel including light reflectors that move when an actuating electrical signal is applied to the graphically alterable panel, and a power supply coupled to the graphically alterable panel. The power supply is adapted to selectively provide the actuating electrical signal to the graphically alterable panel to cause movement of at least some of the light reflectors, and light emitted from the light source is reflected off the graphically alterable panel. Movement of the light reflectors changes the reflectivity of the light reflectors such that movement of the light reflectors changes the reflection of light off of the graphically alterable panel, and the graphically alterable panel defines at least part of an interior trim component or the graphically alterable panel is arranged to reflect light onto a show surface of the interior trim component.

In at least some implementations, the graphically alterable panel includes electronic ink in multiple cells, and the actuating electrical signal is provided to at least some of the multiple cells independently of at least some other cells of the multiple cells.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
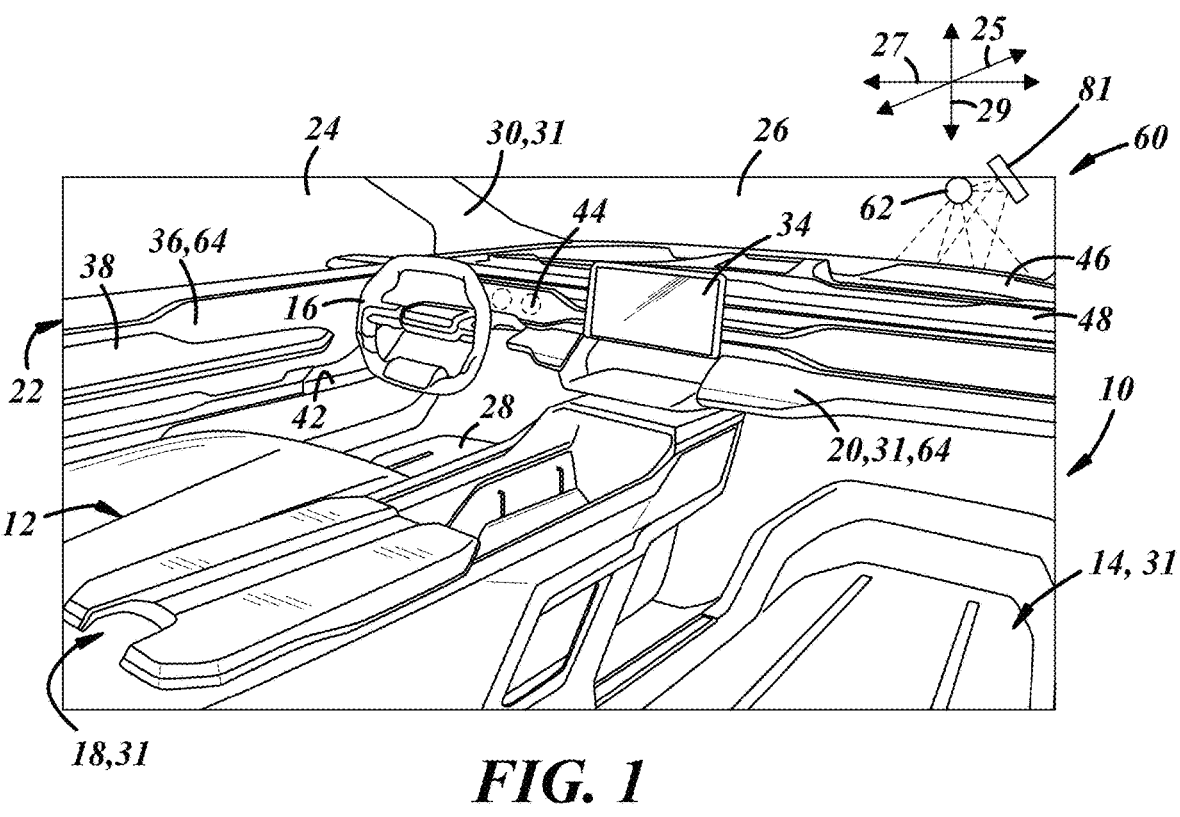
FIG. 1 is a perspective view of a portion of a vehicle passenger compartment including a lighting system.

Referring in more detail to the drawings, FIG. 1 illustrates part of a vehicle passenger compartment 10. The passenger compartment 10 is shown as including two front seats 12, 14 that are commonly referred to as a driver's seat 12 which may have a steering wheel 16 or other steering input in front of the driver seat 12, and a front passenger's seat 14 generally next to driver's seat 12. The passenger compartment 10 may include a console 18 between the seats 12, 14, and an instrument panel 20 or dashboard in front of the seats 12, 14 and generally at a forward end of the passenger compartment 10, and one or more doors 22 at and defining part of the opposite (e.g. left and right) sides of the passenger compartment 10. The doors 22 may include windows 24, and the passenger compartment 10 may further be defined by a windshield 26 at the forward end, a rear window (not shown) and the rearward end, a floor 28 at the bottom and a roof (not shown) at the top of the passenger compartment 10. In this disclosure: 1) the direction between the forward and rearward ends of the passenger compartment 10 is called the fore-aft direction and is generally indicated by arrow 25; 2) the direction between opposite sides of the vehicle, e.g. left and right sides and defined in part by one or more doors 22, is called the cross-car direction and is generally indicated by arrow 27; and 3) the direction between the floor and roof is called the vertical direction and is generally indicated by arrow 29.

To improve the appearance and comfort of the passenger compartment 10, and for other reasons, various components that define parts of the passenger compartment 10, like parts of the vehicle frame or substructure, the doors 22, roof, floor and pillars 30 (e.g. A, B and C pillars) extending to the roof, include interior trim components 31. The interior trim components 31 may include fabric layers, carpet, a headliner, seat coverings as well as interior trim components molded from a variety of materials and including outer surfaces exposed/viewable within the passenger compartment 10.

Figure 2:
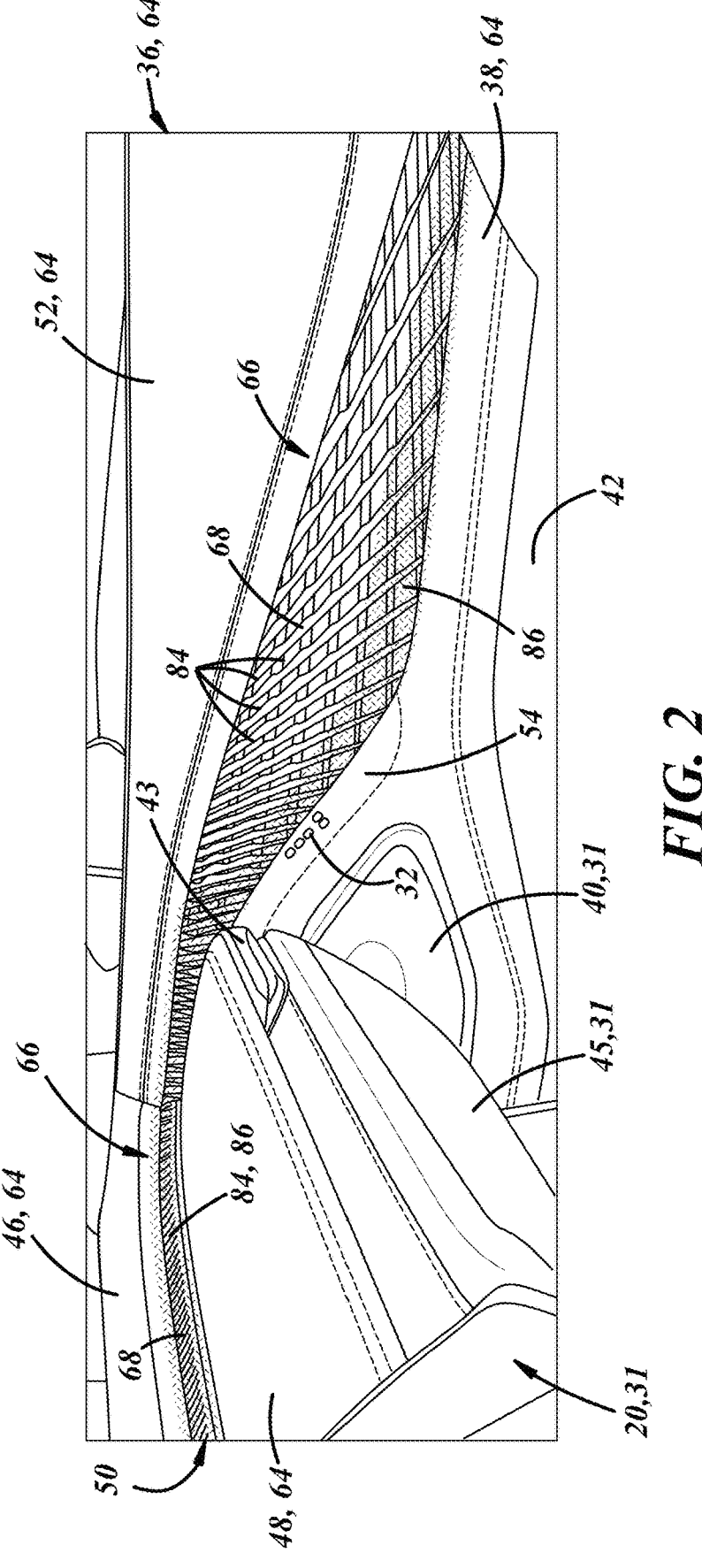
Figure 4:
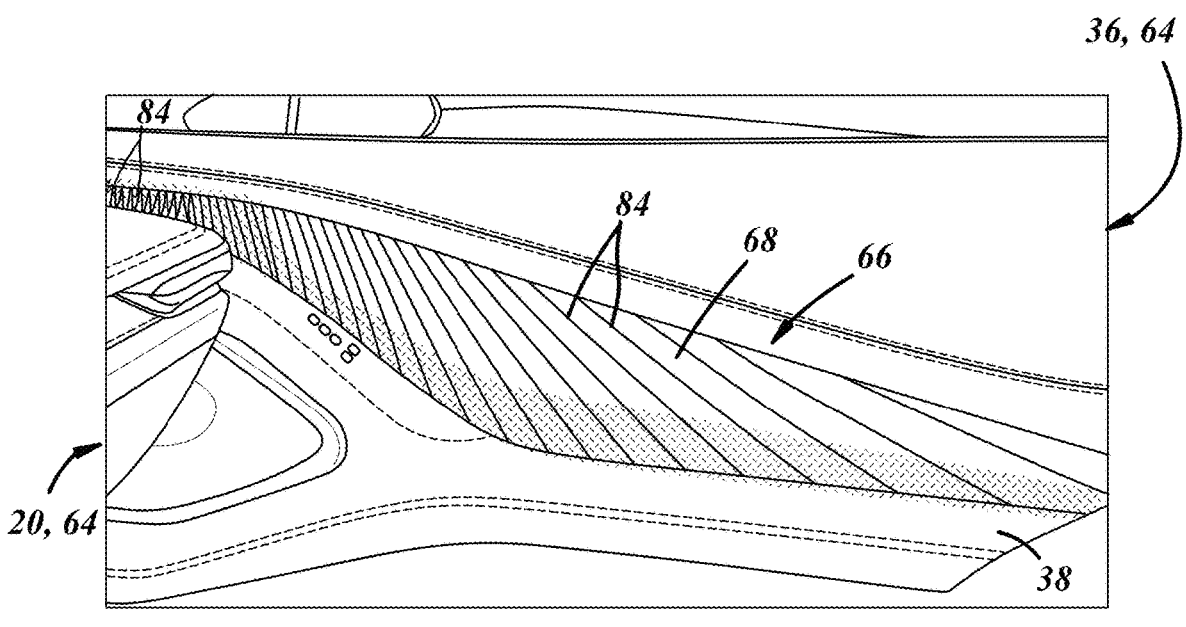
Figure 5:
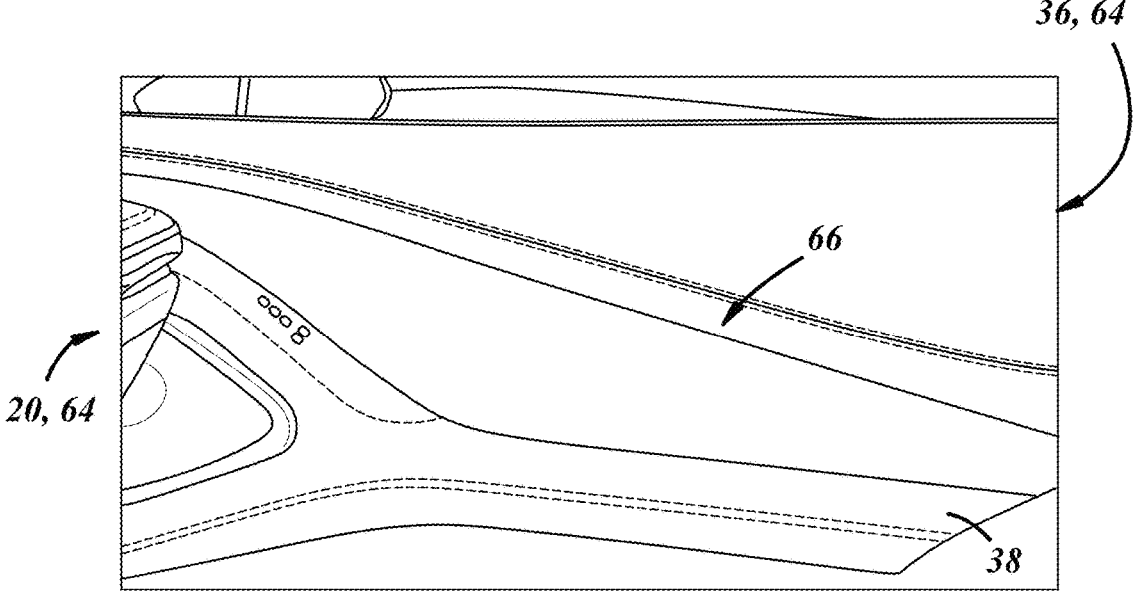

In addition to covering structural components, the interior trim components may cover and/or mount and provide access to electronic and mechanical devices, such as switches 32 (FIG. 2), knobs, display screens 34 (FIGS. 1 and 2), door handles, gear shifters, interior lights such as overhead lights mounted at the roof, and the like. For example, as shown in FIG. 2, a door 22 may include one or more interior trim components such as door panel 36 that extends mostly vertically and in the fore-aft direction 25, an armrest 38 mounted to the door panel 36 and extending fore/aft and in the cross-car direction into the passenger compartment 10, and a speaker cover 40 mounted to the door panel 36. A switch 32 for opening and closing the window 24 may be provided in/on the armrest 38 or door panel 36, and a storage compartment 42 may be formed in the door panel 36 and located beneath the armrest 38.

As shown in FIGS. 1 and 2, the instrument panel 20 may extend in the cross-car direction and rearward in the fore-aft direction from the windshield 26 toward the front seats 12, 14. The instrument panel 20 may include openings or mounts for display of gauges 44 (FIG. 1), the infotainment display screen 34, HVAC vents 43 and a storage compartment 45 (e.g. glove box which may include a trim component 31 or decorative cover as part thereof). In the implementation shown in FIG. 2, the instrument panel 20 includes a first portion 46 adjacent to the windshield 26 and extending in the cross-car direction and part of the way outward toward the passenger seat 14 in the fore-aft direction, and the instrument panel 20 includes a second portion 48 that extends in the fore-aft direction from the first portion. The second portion 48 is lower, vertically, than the first portion 46 and a transition 50 or step is defined between the portions 46, 48. The door panel 36 may also include an upper portion 52 closest to the window 24 and vertically aligned with the first portion 46 of the instrument panel 20 at a forward end of the upper portion 52, providing a continuing surface between the panels 20, 36. Similarly, a forward part 54 of the armrest 38 may be inclined vertically and generally aligned with the second portion 48 of the instrument panel 20 so that the door panel 36 generally matches the contours and shapes of the instrument panel 20. Any or all of the interior components having a surface (sometimes called a "show surface") visible within the passenger compartment may be considered to be trim components 31.

For decoration and to illuminate various features and components, for example, a vehicle interior lighting system 60 (FIGS. 1 and 8) may include a portion that provides accent lighting within and radiating or reflecting from one or more interior trim components 31. The accent lighting may be in the form of one or more light sources 62, such as but not limited to LEDs (individual or multiple, such as LED matrices), including one or more emitters that emit light in discrete areas or in continuous runs or lengths of light (e.g. light guides or tubes). Among other things, use of LEDs as a light source 62 provides an energy efficient system and allows the color (e.g. wavelength) and/or intensity or brightness (e.g. luminance) of the emitted light to be easily changed by a user and thus, permits customization of the appearance of the passenger compartment 10, as desired by a user. Of course, any light source may be used and this disclosure is not limited to LEDs or light bulbs with or without a lens or other lower energy light sources.

Many decorative lighting systems are useful only in conditions having low ambient light as the interior lighting is muted or washed out by ambient light entering the vehicle. Further, different types of coverings for the trim components can reflect light differently leading to significantly different reflective levels and appearances in similar vehicle models having different interior trim coverings. For example, some trim components include reflective trim pieces having outer surfaces formed from polished plastics, aluminum or chrome and these trim components will reflect more light than fabric surfaces like suede, leather and cloth (woven and non-woven) and synthetic materials, especially when these materials are provided in darker colors. Thus, with the same light source(s), the appearance within vehicles can be very different. Further, the exterior surface of the trim pieces are static, and the appearance thereof does not change absent a change in light being reflected from the surfaces.

To permit the appearance of a trim component to change, and to be controlled, the vehicle includes an interior lighting system 60 that includes at least one trim component that has a body 64 mountable to the vehicle and including a graphically alterable panel 66 carried by the body 64. The graphically alterable panel 66 is controllable so that the appearance of an outer surface 68 of the panel 66 can be changed. The lighting system 60 also includes one or more light sources 62 from which light is emitted, the power supply 70 (FIG. 8) or other actuator coupled to the panel 66 and a control system 72 including one or more controllers 74 arranged to control application of an electrical actuating signal from the power supply 70 to the panel 66. Different actuating signals may be applied to the panel 66 to change an appearance of the outer surface 68 of the panel 66, and provide a different reflection of light off the panel 66 when the light source 62 emits light that is reflected by the outer surface 68.

The graphically alterable panel 66 may include a so-called electrophoretic or electronic ink display, which may use any desired electronic ink technology, such as but not limited to those from E-ink Corporation and Xerox. Electrophoretic displays include light reflectors 76 that move when an actuating electrical signal is applied to portions of the panel 66 including the light reflectors 76. The panels 66 typically include multiple cells 78 or microcapsules in which reflective particles are received in a liquid 80. When an actuating signal is applied to a cell 78, the light reflectors 76 in that cell 78 move and the reflectivity of that cell 78 changes. Movement of the light reflectors 76 can include movement toward and away from the outer surface 68 (e.g. so that in one position the light reflectors 76 are visible at the outer surface 68 and in another position the light reflectors 76 are not visible and the fluid is visible), or rotation so that different surfaces or portions of the light reflectors 76 are visible depending upon the actuated state of the cell 78. Movement of the light reflectors 76 may occur due to polarity of the particles and a polarity of the actuating signal, for example. The panel 66 need not emit light itself and can instead by an indirect light source by reflection of light projected onto the panel 66. The light source(s) 62 can directly project light onto the panel 66, or emitted light from the light source 62 may be reflected onto the panel 66, which may provide a more even illumination of the panel 66, if desired. The light system 60 may include one or more reflectors 81 arranged in the path of light emitted from the light source 62 and arranged to direct light onto the panel 66 to illuminate the panel 66. The reflector 81 may be stationary or movable to create different lighting effects, if desired. The luminance or intensity/brightness of the light directed onto the panel 66 may be controlled so that the luminance or brightness of reflected light off the panel 66 can be controlled to manage the overall lighting in the vehicle that is caused by the system 60. By way of a non-limiting example, lower light within the passenger compartment may be preferred in low ambient light conditions (e.g. nighttime), but this disclosure is not limited to reducing light output only in low ambient light conditions.

With coordinated actuation of the cells 78 of the panel 66, as managed by a controller 74 and suitable instructions and programs 82, different visual appearances or patterns may be visible at the outer surface 68. The patterns may include lines 84 or regions 86 of the panel 66 in which the light reflectors 76 are visible and other regions in which the light reflectors 76 are not visible at the outer surface 68. In this context, visible is intended to be interpreted with reference to being viewable by a human with normal vision (for example, but not limited to 20/20 vision). After an actuating signal causes a pattern to appear, the actuating signal need not be maintained. The pattern is maintained until a different actuating signal is provided. The patterns may thus be static, for at least some period. Additionally, successive actuating signals can create a display or output that provides a moving or motion display, if desired.

FIGS. 2-5 show portions of some interior trim components of the vehicle that include a graphically alterable panel 66. In this example, part of a door covering 36 and part of the dashboard 20 include panels 66 in portions of these components. All or part of a trim component of the vehicle interior may include a graphically alterable panel 66. The panels 66 in these components may be aligned so that a pattern may continue from one panel 66 to the next and provide a more seamless presentation.

Figure 3:
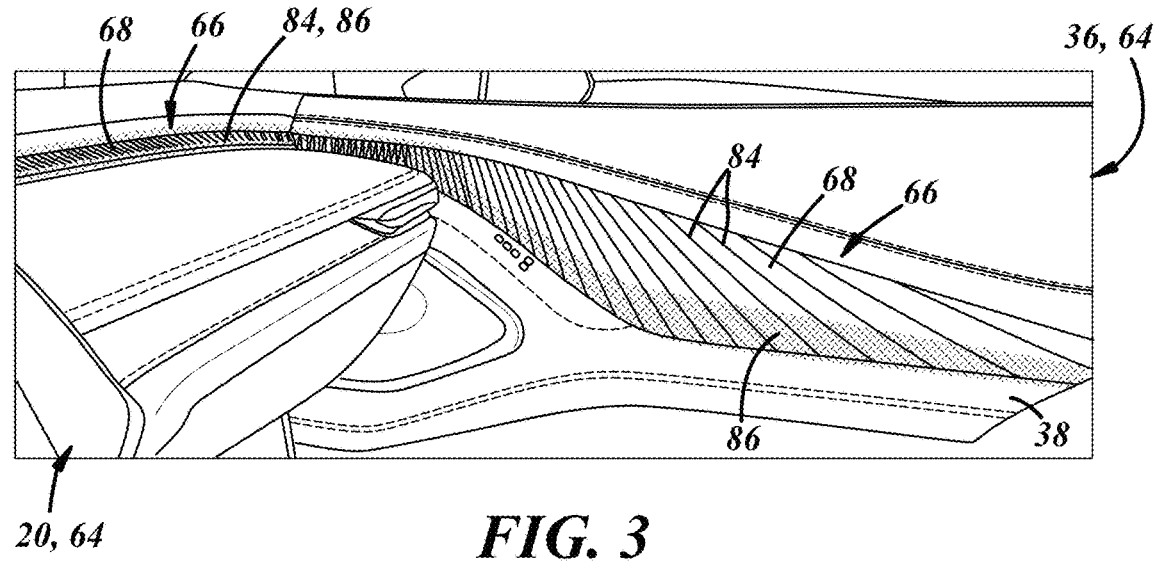
FIGS. 2-5 are perspective views of a portion of the passenger compartment and including part of a door and part of an instrument panel or dashboard, and showing different reflective patterns on interior trim components of the door and instrument panel.
Figure 6:
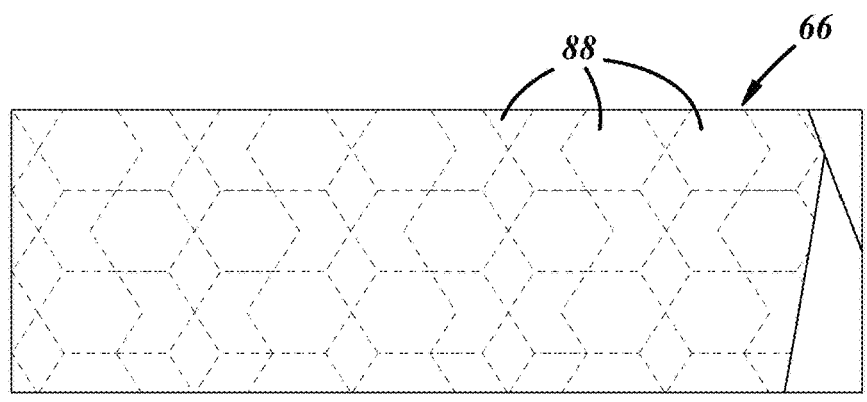
FIGS. 6 and 7 are fragmentary plan views of an outer surface of a trim component showing a graphically alterable panel having a decorative pattern provided at different reflective light intensities.
Figure 7:
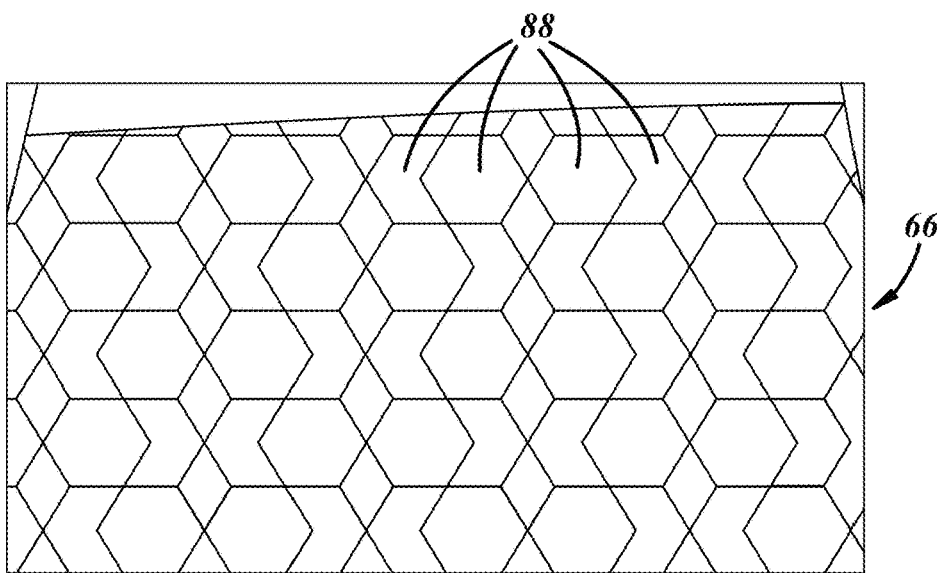

In FIG. 2, the pattern includes intersecting lines 84 that provide an interlaced or woven appearance, and may include a shaded area 86 where the pattern blends or fades, for example. The shaded area 86 and similar lines 84 continue from the panel 66 on the door covering 36 to the panel 66 on the dashboard 20. In the example shown in FIG. 3, the pattern includes vertical and inclined lines 84, without the intersecting lines, and may include the shaded area(s) 86 as well, while in the example shown in FIG. 4, the lines 84 like those in FIG. 3 are provided but the shaded area 86 is not provided. Next, in the example shown in FIG. 5, no lines 84 are provided and the light reflectors 76 are all controlled so that they are not visible at the outer surface 68 of the panels 66. In the example shown in FIGS. 6 and 7, the pattern includes various polygons 88, shown as arrays of hexagons and star shapes. In FIG. 6, fewer light reflectors 76 are used in each area and the pattern is shown with less contrast between adjacent parts of the pattern. In FIG. 7, greater contrast is achieved with more light reflectors 76 used to define the darker areas of the pattern. These are just a few examples of the nearly limitless number of patterns that may be achieved by the graphically alterable panels 66.

As noted herein, one or more interior trim components may include an outer surface 68 visible from within a passenger compartment 10 of the vehicle and defined at least in part by a graphically alterable panel 66 that includes light reflectors 76 that move when an actuating electrical signal is applied to the graphically alterable panel 66 by a power supply 70 of the vehicle. So arranged, light emitted from a light source 62 is reflected off the graphically alterable panel 66 and a pattern (e.g. arrangement of light reflectors 76) can be viewed. The light reflectors 76 can be moved to change the reflectivity of the light reflectors 76 such that movement of the light reflectors 76 changes the reflection of light off of the graphically alterable panel 66 and the appearance of the graphically alterable panel 66. The graphically alterable panel 66 may include electronic ink in multiple cells 78, sometimes called microcapsules, and the actuating electrical signal can be provided to at least some of the multiple cells 78 independently of at least some other cells 78 of the multiple cells 78, to selectively actuate light reflectors 76 in some cells 78 but not other cells. The light source 62 may provide light at different wavelengths or colors, or filters or multiple light sources may be used to achieve a wide range of illumination conditions that alter the appearance of the panels 66.

In at least some implementations, a user may provide a pattern to the control system 72 such that the pattern(s)

displayed are selectable and/or customizable by the user. For example, a user may upload to the control system 72, from a smartphone, tablet or computer, an image or series of images for display on one or more panels 66. And the control system 72 may provide a user interface by which a user may adjust or change or customize a pattern to be displayed. As noted herein, the control system 72 may be part of an incorporated into a vehicle computer or control network and may be accessible to a user via a typical user interface provided in vehicles.

The panels 66 need not include light emitting elements or light sources and can instead rely on reflected light. In this way, the energy needed to provide a pattern on a panel 66 is very low and need not be continuously maintained. Further, the display on a panel 66 is visible when greater ambient light is present, unlike interior LED lighting in vehicles, that is washed out and not effective in daylight or other greater ambient light conditions. The panels 66 can be flexible and incorporated into a wide range of trim components including, but not limited to, seat covers, door panels 36, dashboards 20, center consoles 18, headliners, covers/trim placed over structural pillars of the vehicle (e.g. A, B, C pillars), and the like.

Further, the patterns that can be provided are not limited to decorative patterns and may provide information as well. For example, the patterns can provide letters and words and symbols (e.g. functional indicia) to facilitate operation of vehicle systems and components, such as but not limited to, switches, infotainment system features (e.g. audio, video, navigation systems, vehicle settings), HVAC system controls, and the like. Panels 66 can provide information and decoration together or at different times, as desired. In this way, for example, a panel 66 could provide a decorative display when information is not needed to be displayed, and can be actuated to display information (e.g. functional indicia) when needed.

Figure 8:
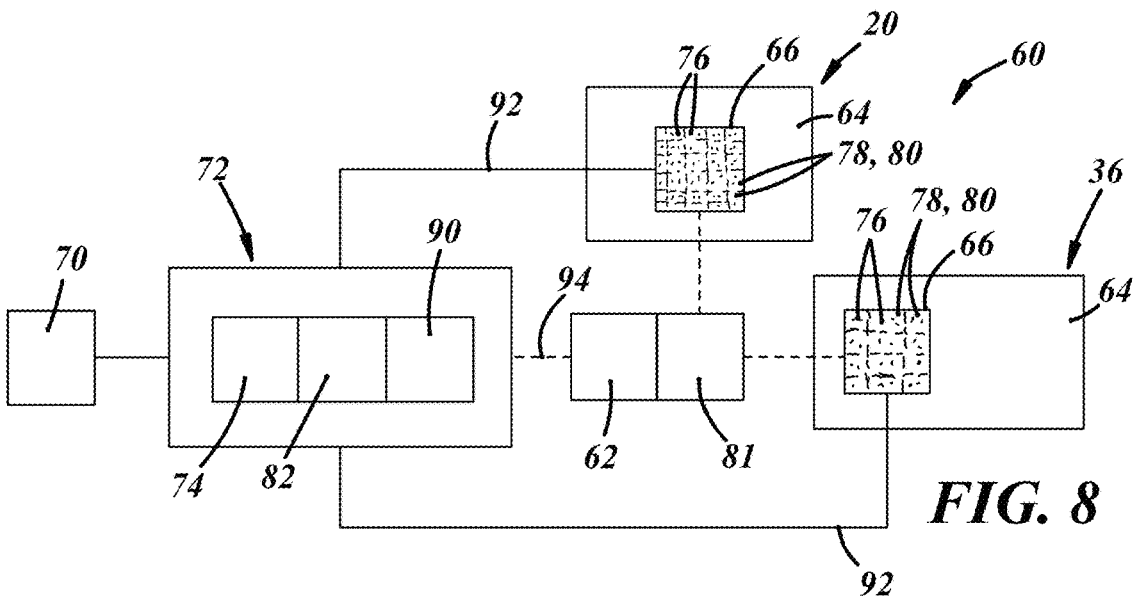
FIG. 8 is a schematic view of the lighting system.

As shown in FIG. 8, in order to perform the functions and desired processing set forth herein, as well as the computations therefore, the control system 72 may include, but is not limited to, one or more controller(s) 74, control unit(s), processor(s), computer(s), DSP(s), memory 90, storage, register(s), timing, interrupt(s), communication interface(s), and input/output signal interfaces, and the like, as well as combinations comprising at least one of the foregoing. For example, the control system 72 may include input signal processing and filtering to enable accurate sampling and conversion or acquisitions of such signals from communications interfaces and sensors. As used herein the terms control system 72 may refer to one or more processing circuits such as an application specific integrated circuit (ASIC), an electronic circuit, a processor (shared, dedicated, or group) and memory 90 that executes one or more software or firmware programs 82, a combinational logic circuit, and/or other suitable components that provide the described functionality. The control system 72 may be distributed among different vehicle modules, such as an infotainment system control module, engine control module or unit, powertrain control module, transmission control module, and the like, if desired, and the memory and one or more processors may be one or both integrated into the vehicle or remotely located and wirelessly communicated to the vehicle, as desired.

The term "memory" 90 or "storage" as used herein can include computer readable memory, and may be volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRAM). The memory 90 can store an operating system and/or instructions executable by a processor or controller 74 or the like to enable control or allocate resources of a computing device.

The light system 60 including the controller 74 is shown in FIG. 8. The controller 74 provides or controls application of power to the panels 66 of the bodies 64 of the trim components via wires 92, and to the light source 62 by wires 94. Light emitted from the light source 62 is directed from the light source 62 onto the panels 66 by the reflector 81.

FIGS. 9-13 illustrate examples in which one or both of the light source 62 and the panel 66 are located behind one or more interior trim components 96, 98. The light source 62 and panel 66 are arranged so that light from the light source 62 is projected onto the panel 66 and reflected light from the panel 66 is then directed onto an exterior or show surface 100, 102 (i.e. a surface visible by an occupant in the vehicle) of the interior trim components 96, 98.

Figure 9:
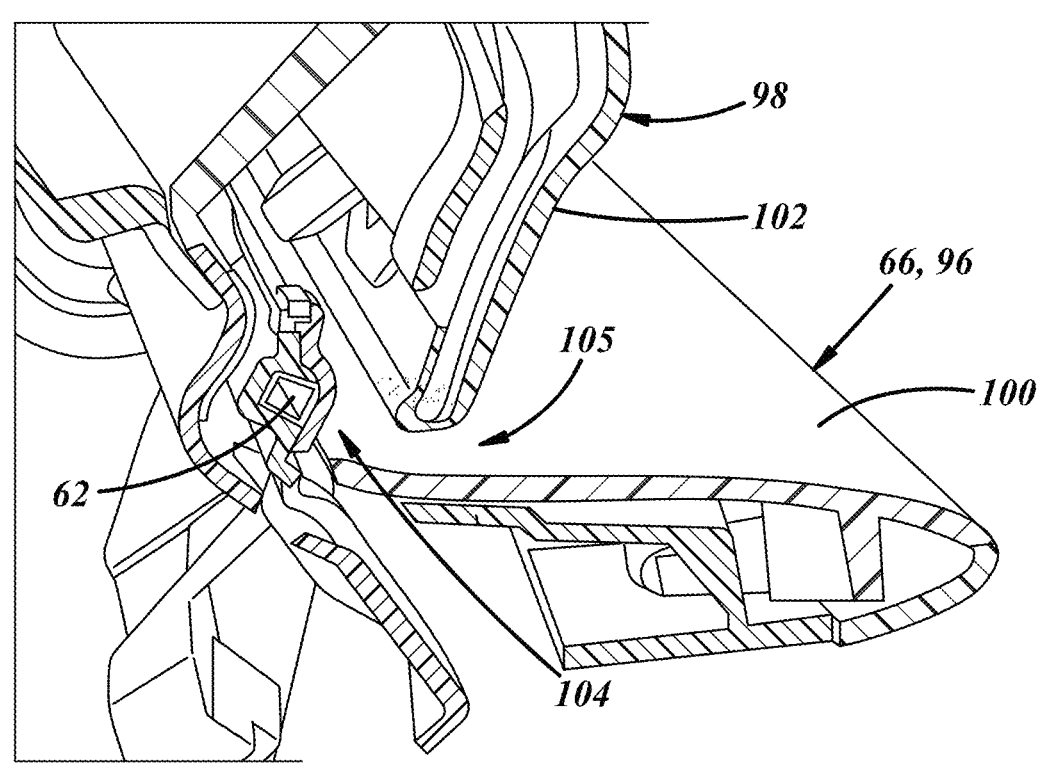
FIG. 9 is a perspective sectional view showing a light system with a light source behind interior trim components of a vehicle, where one or both trim components include a graphically alterable panel.
Figure 10:
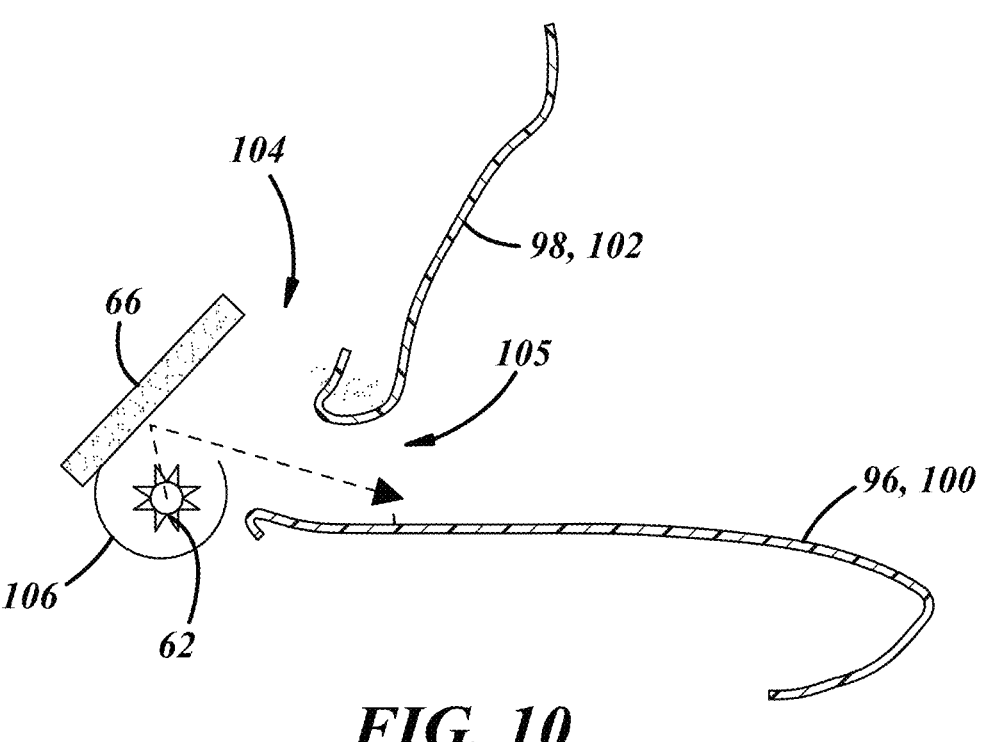
FIG. 10 is a diagrammatic view of a light system with a light source and graphically alterable panel arranged to direct light onto a trim component.
Figure 11:
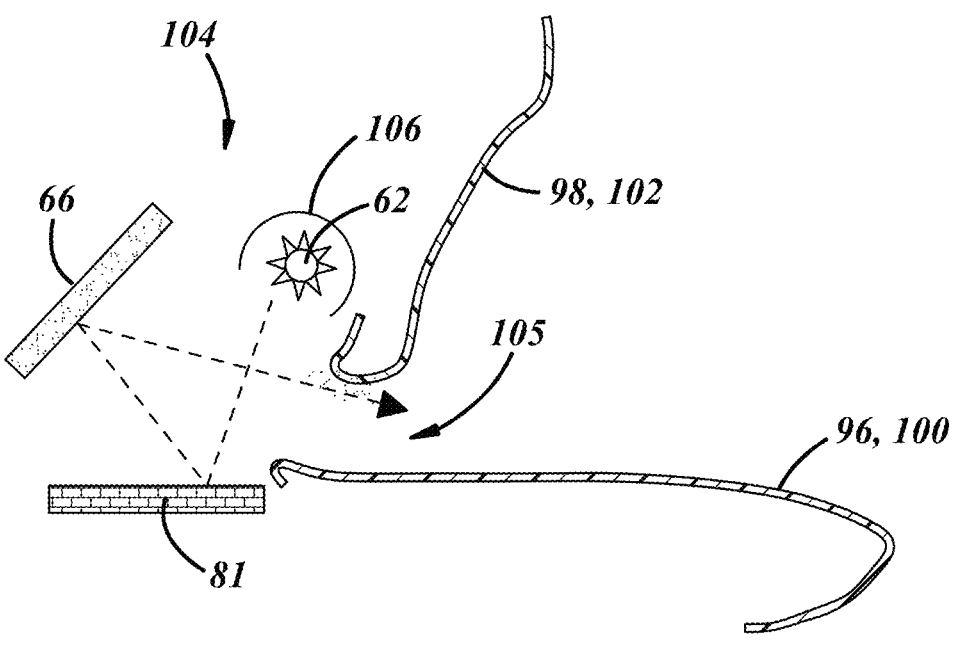
FIG. 11 is similar to FIG. 10 and includes a reflector between the light source and panel.

In FIG. 9, the light source 62 is located in a space 104 behind the show surfaces of the trim components 96, 98 and the light source 62 projects light through an opening 105 between the components 96, 98 or in a component, and the light shines directly onto the panel 66 which defines part or all of the show surface of one of the trim components 98. In FIG. 10, the light source 62 and panel 66 are both located in the space 104 behind the trim components 96, 98, and light from the light source 62 is reflected off the panel 66 and onto show surfaces 100, 102 of the trim components 96, 98. A lens 106 or cover (e.g. as in a light guide or otherwise) may be used to control the direction of light from the light source 62, if desired. In FIG. 11, the light source 62, panel 66 and a reflector 81 are arranged in the space 104, and light from the light source 62 is directed onto the reflector 81 and then onto the panel 66 and then onto the show surfaces 100, 102 of the trim components 96, 98.

Figure 12:
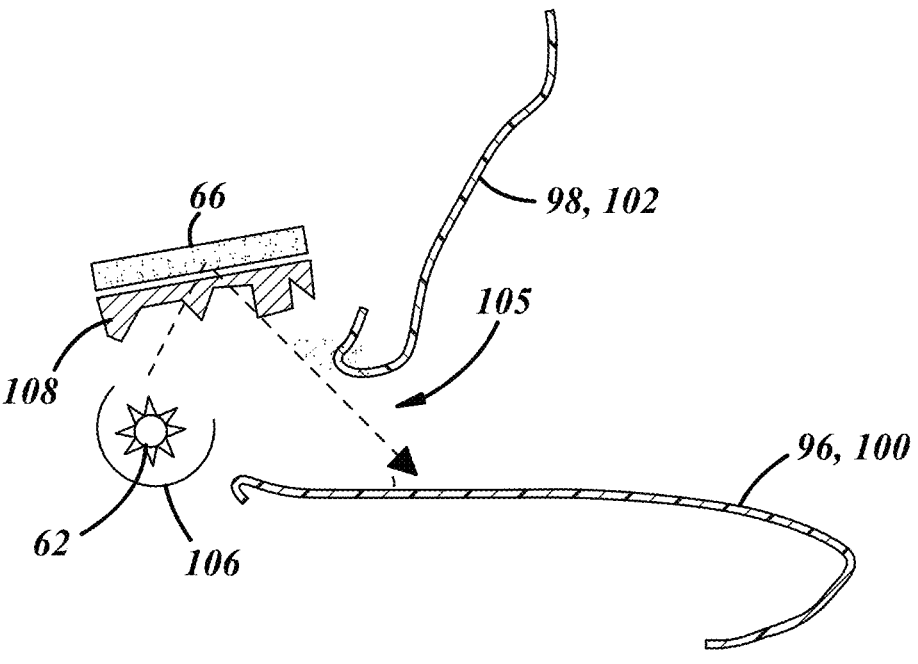
FIG. 12 is similar to FIG. 10 and includes a light modifier associated with the panel to alter the appearance of light reflected from the panel.
Figure 13:
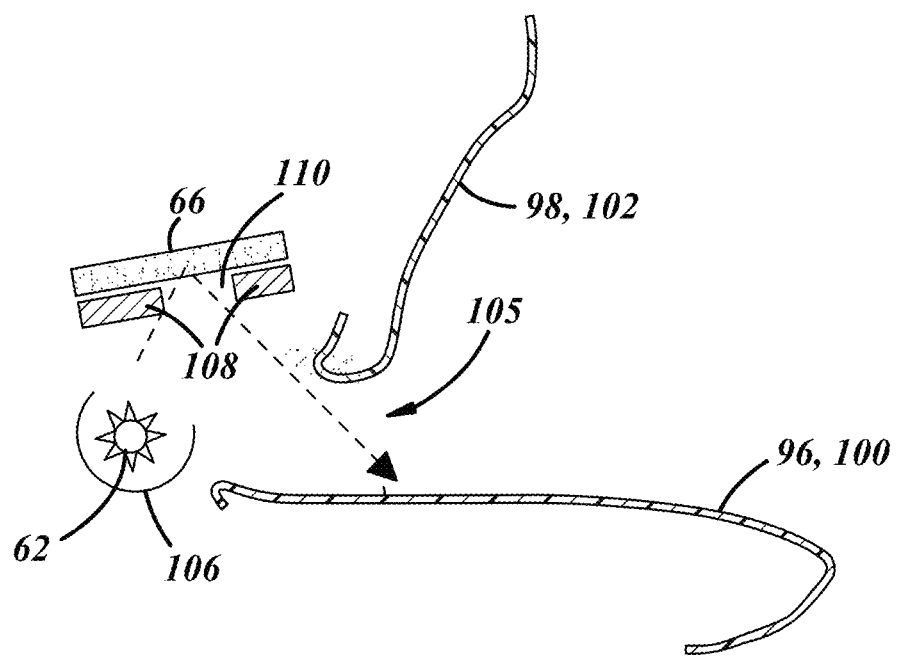
FIG. 13 is similar to FIG. 10 and includes a light modifier associated with the panel to alter the appearance of light reflected from the panel

In FIG. 12, a lens or other light modifier 108 is provided on the graphic panel 66 or otherwise between the light source 62 and the panel 66 to affect, control or otherwise modify the light that is provided onto or reflected from the panel 66, or both. The light modifier 108 could be of uniform thickness and transparency or reflectivity, or it may have variable thickness, shape, transparency (including opaque or selectively opaque portions) and may be arranged to provide a desired reflected light from the panel 66. As shown in FIG. 13, the light modifier 108 may have one or more openings 110 formed therein or it may be comprised of multiple pieces separately mounted to the panel 66 or other structure. The light modifiers could also be mounted to or adjacent to the light source 62, such as on the lens or cover thereof, by way of non-limiting examples.

The graphically alterable panels 66 can thus define part of a show surface of a trim component or they may project light onto the show surface of a trim component to alter the appearance of the trim component. With a graphic panel 66 located behind a trim component, the panel 66 need not be shaped and finished to define a show surface, and a smaller panel can be used with light reflected onto a comparatively larger area of a trim component for more efficient and cost-effective use of the graphically alterable panels 66.

What is claimed is:

1. A vehicle, comprising:

a light source that emits visible light;

a trim component having a show surface arranged to be visible within a passenger compartment of the vehicle wherein the trim component defines at least part of an interior surface of a vehicle door, a vehicle seat, a center console, a headliner, cover received over a vehicle pillar or a dashboard separate from an information display and gauges on the dashboard;

a graphically alterable panel including light reflectors that move when an actuating electrical signal is applied to the graphically alterable panel; and a control system coupled to the graphically alterable panel, the control system including or controlling a power supply adapted to selectively provide the actuating electrical signal to the graphically alterable panel to cause movement of at least some of the light reflectors, wherein light emitted from the light source is reflected off the graphically alterable panel and wherein movement of the light reflectors changes the reflectivity of the light reflectors such that movement of the light reflectors changes the reflection of light off of the graphically alterable panel and the appearance of the show surface, and the graphically alterable panel is arranged to reflect light onto the show surface of the interior trim component, wherein the light source and the graphically alterable panel are arranged in a space behind the interior trim component, the graphically alterable panel is not directly visible from within the passenger compartment, and light is directed onto the show surface through an opening between the space and the show surface.

2. The system of claim 1 which also includes a light modifier arranged to control at least part of the light from the light source that is directed onto of from the graphically alterable panel.

3. The vehicle of claim 1 wherein the light source emits visible light of more than one color.

4. The vehicle of claim 3 which also includes a reflector positioned in the path of emitted light from the light source and arranged to reflect light onto the panel.

5. The vehicle of claim 1 which also includes a light modifier arranged to control at least part of the light from the light source that is directed onto the graphically alterable panel, and wherein the light modifier is a lens that is arranged between the light source and the graphically alterable panel, and the light modifier has one or both of different thickness in different portions of the light modifier and different transparency in different portions of the light modifier.

6. The vehicle of claim 5 wherein the light modifier is arranged between the graphically alterable panel and the show surface.

7. The system of claim 1 wherein the graphically alterable panel includes electronic ink in multiple cells, and the actuating electrical signal is provided to at least some of the multiple cells independently of at least some other cells of the multiple cells.

8. The system of claim 7 wherein the electronic ink includes reflective particles and liquid within the multiple cells, and wherein the reflective particles within one of the multiple cells move when the actuating electrical signal is provided to the cell.

9. The system of claim 8 wherein movement of the reflective particles includes rotation of the reflective particles so that different portions of the reflective particles are exposed to an outer surface of the graphically alterable panel.

10. The vehicle of claim 1 wherein the graphically alterable panel includes electronic ink in multiple cells, and the actuating electrical signal is provided to at least some of the multiple cells independently of at least some other cells of the multiple cells.

11. The vehicle of claim 10 wherein the electronic ink includes reflective particles and liquid within the multiple cells, and wherein the reflective particles within one of the multiple cells move when the actuating electrical signal is provided to the cell.

12. The vehicle of claim 11 wherein movement of the reflective particles includes rotation of the reflective particles so that different portions of the reflective particles are exposed to an outer surface of the graphically alterable panel.

13. The vehicle of claim 11 wherein movement of the reflective particles includes movement of the reflective particles either toward or away from an outer surface of the graphically alterable panel.

14. A vehicle, comprising:

a light source that emits visible light;

a trim component having a show surface arranged to be visible within a passenger compartment of the vehicle wherein the trim component defines at least part of an interior surface of a vehicle door, a vehicle seat, a center console, a headliner, cover received over a vehicle pillar or a dashboard separate from an information display and gauges on the dashboard;

a graphically alterable panel including light reflectors that move when an actuating electrical signal is applied to the graphically alterable panel; and a control system coupled to the graphically alterable panel, the control system including or controlling a power supply adapted to selectively provide the actuating electrical signal to the graphically alterable panel to cause movement of at least some of the light reflectors, wherein light emitted from the light source is reflected off the graphically alterable panel and wherein movement of the light reflectors changes the reflectivity of the light reflectors such that movement of the light reflectors changes the reflection of light off of the graphically alterable panel and the appearance of the show surface, and wherein the graphically alterable panel defines at least part of the show surface of the interior trim component or the graphically alterable panel is arranged to reflect light onto the show surface of the interior trim component, wherein the interior trim component is a first interior trim component and wherein the vehicle includes a second interior trim component mounted adjacent to the first interior trim component and wherein a continuous pattern is displayed on the first interior trim component and the second interior trim component.

15. The vehicle of claim 14 wherein the graphically alterable panel is a first graphically alterable panel and defines at least part of the show surface of the first interior trim component, and the vehicle includes a second graphically alterable panel that is separate from the first graphically alterable panel and defines at least part of the show surface of the second interior trim component, and wherein the continuous pattern is provided simultaneously on both the first graphically alterable panel and the second graphically alterable panel.

16. The vehicle of claim 15 wherein the first graphically alterable panel is part of the vehicle door and the second graphically alterable panel is part of the dashboard.

17. A vehicle, comprising:

a light source that emits visible light;

a trim component having a show surface arranged to be visible within a passenger compartment of the vehicle wherein the trim component defines at least part of an interior surface of a vehicle door, a vehicle seat, a center console, a headliner, cover received over a vehicle pillar or a dashboard separate from an information display and gauges on the dashboard;

a graphically alterable panel including light reflectors that move when an actuating electrical signal is applied to the graphically alterable panel; and a control system coupled to the graphically alterable panel, the control system including or controlling a power supply adapted to selectively provide the actuating electrical signal to the graphically alterable panel to cause movement of at least some of the light reflectors, wherein light emitted from the light source is reflected off the graphically alterable panel and wherein movement of the light reflectors changes the reflectivity of the light reflectors such that movement of the light reflectors changes the reflection of light off of the graphically alterable panel and the appearance of the show surface, and wherein the graphically alterable panel defines at least part of the show surface of the interior trim component and the light source is located behind the interior trim component and projects light through an opening, where the opening is defined between the interior trim component and another component, or the opening is defined in the interior trim component.

\* \* \* \* \*